Patented May 4, 1943

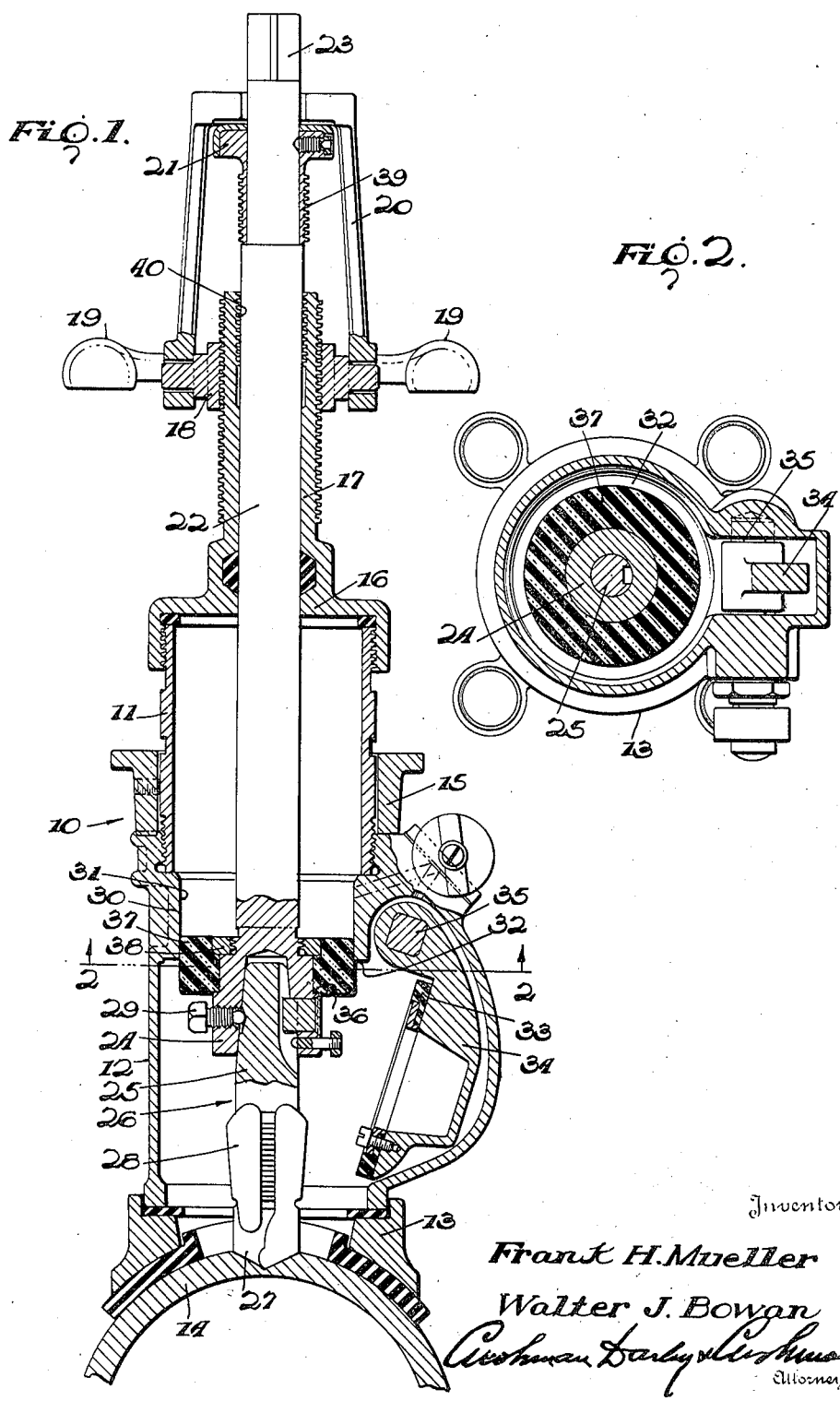

2,318,321

UNITED STATES PATENT OFFICE 2,318,321

DRILLING APPARATUS

Frank H. Mueller and Walter J. Bowan, Decatur, Ill., assignors to Mueller Co., Decatur, Ill., a corporation of Illinois Original application July 17, 1940, Serial No. 346,052. Divided and this application December 12, 1941, Serial No. 422,768

7 Claims. (Cl. 77—38)

This invention relates to drilling apparatus and particularly to drilling apparatus of the type used in drilling and tapping an opening in a main without substantial loss of pressure fluid in the main. An object of the invention is to provide means for effectively centering the bit, the latter, as particularly contemplated herein, including drilling and tapping portions. One manner of carrying out the invention will be described with reference to the embodiment shown in the accompanying drawing in which:

Figure 1 is an axial section of a drilling machine in accordance with the invention, the view also including a partial transverse section of a main with which the machine is operatively associated, and Figure 2 is a section substantially on line 2—2 of Figure 1.

Referring to the drawing, reference numeral 10 designates generally a housing or barrel comprising outer and inner portions 11 and 12 threaded together. The inner portion 12 is packed against a saddle 13 which in turn is packed against the main 14 in which a hole is to be drilled and tapped, the barrel being held in substantially radial position by means of a tensioned belt, not shown, passed around the main and having its ends secured to suitable anchoring means, not shown, on a collar 15 which surrounds portion 11 and rests against the top rim of portion 12.

A cap 16 is threaded on the outer end of portion 11 and sealed against the upper end of the latter. The cap has an outer extension or neck 17 provided with external threads engaged by a feed nut 18 equipped with handles 19, and pivoted to the nut is a yoke 20 which engages over an abutment 21 on a boring bar 22 which is rotatable and reciprocable in an axial bore of neck 17. The bar 22 can be operatively advanced by threading nut 18 downwardly on neck 17 and the bar is enabled to be rotated by means of a suitable tool applied to its squared upper extremity 23.

At its inner end bar 22 is provided with a head 24 in which is formed a socket which receives the shank 25 of a bit or tool 26 having a drilling portion 27 surmounted by a tapping portion 28, the shank of the bit being retained in the socket by any suitable means such as a set screw 29.

The upper end of barrel portion 12 is inwardly thickened to provide a constriction 30 which presents a cylindrical guide surface 31 coaxial with the bore of neck 17, the upper edge of the surface being preferably beveled, as shown. As here shown the constriction is of restricted length and is disposed about midway between the ends of the barrel 10, the chamber portions above and below the constriction being of substantially greater cross sectional area than the latter. The diameter of the cylindrical guide surface, however, is sufficient to freely pass the tool 26 and the head 24 of the boring bar. The constriction terminates downwardly in a flat shoulder 32 which serves as a seat for cooperation with the packing 33 carried by a flop valve 34 which is operatively mounted on a rock shaft 35.

Set against a shoulder 36 of head 24 is a cylindrical disc 37 which is retained by a threaded ring 38 or other appropriate means, the disc being coaxial with the boring bar. The diameter of disc 37 is such that the disc is enabled to be closely received in the constriction 30 for the purpose of accurately centering the lower end of the boring bar and therewith the tool 26, the disc rotating in and axially traversing the constriction during the drilling operation. The disc may be formed of metal, rubber or leather, the material being such preferably as not to be readily chipped or burred.

In the use of the apparatus the barrel is first mounted on the main in the absence of cap 16, boring bar 22, and their associated equipment. The boring bar is now inserted in the upper barrel portion and the cap is threaded on the latter. It not infrequently occurs that the barrel has to occupy a radially tilted position relative to the main and the space between its upper end and the adjacent wall of the excavation may be so restricted that it would be impossible to insert the boring bar in the barrel portion 11 by direct axial movement. Such direct axial movement would be required if the diameter of the upper barrel portion were the same as that of the constriction 30, but in view of the greater internal diameter of portion 11 and the consequent tiltability of disc 37 therein, the boring bar can be inserted at an angle to the axis of the barrel and then aligned so that the cap 16 can be screwed on.

The relation of parts is such that when the boring bar is advanced disc 37 will enter constriction 30 just before the point of the drill engages the main. Consequently, when engagement of the drill occurs it will be accurately centered with respect to the barrel and this centering effect will continue as the main is pierced. Just before the tapping portion 28 enters the drilled hole, however, disc 37 passes beyond constriction 30 so that its centering effect ceases and the tapping portion is free to seek its own adjustment so that undue strains which might otherwise be placed thereon are avoided. It may be mentioned that in the illustrated construction advance of the boring bar in conformity with the pitch of the tapping threads is effected during the tapping operation through engagement of threads 39 and 40 but this is no essential with respect to the invention claimed herein.

In the fully developed form of the invention as illustrated, therefore, manipulability in assembly of the boring bar with the barrel is retained, the tool is rigidly centered during drilling but is free to adjust itself during the tapping operation, and the lower shoulder of the centering constriction is utilized as a seat for the flop valve. Needless to say, we do not confine ourselves to the precise details of the illustrated form and arrangement of parts, the invention embracing also variations coming thereunder as defined in the claims.

This application is a division of our application Serial No. 346,052, filed July 17, 1940, now Patent No. 2,291,979, issued August 4, 1942.

We claim:

1. In a drilling machine, a barrel adapted to be disposed in substantially radial relation to a main to be drilled, closure means for the outer end of said barrel, a boring bar rotatable and reciprocable in a bore provided in said closure means and arranged to carry a drill at its inner end, said barrel having spaced below its outer end an internal constriction providing a cylindrical guide surface of sufficient diameter to pass the drill and the inner end of the bar, and centering means on said bar adjacent the lower end of the latter cooperative with said guide surface, the arrangement being such that said centering means enters said constriction just before a drill carried by said bar engages the main as the bar is moved inwardly.

2. In a drilling machine, a barrel adapted to be disposed in substantially radial relation to a main to be drilled, closure means for the outer end of said barrel, a boring bar rotatable and reciprocable in a bore provided in said closure means and arranged to carry a drill at its inner end, said barrel having an annular constriction intermediate its ends providing an internal cylindrical guide surface of restricted longitudinal extent and of sufficient diameter to pass the drill and the inner end of the bar, and centering means on said bar adjacent the lower end of the latter cooperative with said guide surface, the arrangement being such that said centering means enters said constriction just before a drill carried by said bar engages the main as the bar is moved inwardly.

3. In a drilling machine, a barrel adapted to be disposed in substantially radial relation to a main to be drilled, closure means for the outer end of said barrel, a boring bar rotatable and reciprocable in a bore provided in said closure means and arranged to carry a drill at its inner end, said barrel having an annular constriction intermediate its ends providing an internal cylindrical guide surface of restricted longitudinal extent and of sufficient diameter to pass the drill and the inner end of the bar, centering means on said bar adjacent the lower end of the latter cooperative with said guide surface, the arrangement being such that said centering means enters said constriction just before a drill carried by said bar engages the main as the bar is moved inwardly, said constriction terminating inwardly in an annular shoulder, and a flop valve cooperating with said shoulder as a seat.

4. In a drilling machine, a barrel adapted to be disposed in substantially radial relation to a main to be drilled and tapped, closure means for the outer end of said barrel, a boring bar rotatable and reciprocable in a bore provided in said closure means and arranged to carry at its inner end a tool having drilling and tapping portions, said barrel having an annular constriction intermediate its ends providing an internal cylindrical guide surface of restricted longitudinal extent and of sufficient diameter to pass the tool and the inner end of the bar, and centering means on said bar adjacent the lower end of the latter cooperative with said guide surface, the arrangement being such that upon moving said bar inwardly said centering means enters said constriction just before the drilling portion of a tool carried by said bar engages the main and leaves said constriction before the tapping portion of the tool engages the hole formed by the drilling portion.

5. In a drilling machine, a barrel adapted to be disposed in substantially radial relation to a main to be drilled and tapped, closure means for the outer end of said barrel, a boring bar rotatable and reciprocable in a bore provided in said closure means and arranged to carry at its inner end a tool having drilling and tapping portions, said barrel having an annular constriction intermediate its ends providing an internal cylindrical guide surface of restricted longitudinal extent and of sufficient diameter to pass the tool and the inner end of the bar, centering means on said bar adjacent the lower end of the latter cooperative with said guide surface, the arrangement being such that upon moving said bar inwardly said centering means enters said constriction just before the drilling portion of a tool carried by said bar engages the main and leaves said constriction before the tapping portion of the tool engages the hole formed by the drilling portion, said constriction terminating inwardly in an annular shoulder, and a flop valve cooperating with said shoulder as a seat.

6. In a drilling machine, a barrel adapted to be disposed in substantially radial relation to a main to be drilled and tapped, closure means for the outer end of said barrel, a boring bar rotatable and reciprocable in a bore provided in said closure means and arranged to carry at its inner end a tool having drilling and tapping portions, said barrel having an internal cylindrical guide surface terminating inwardly in an annular shoulder beyond which the barrel has a cross sectional area greater than that of said guide surface, the diameter of said guide surface being sufficient to pass the tool and the inner end of the bar, and centering means on said bar adjacent the lower end of the latter cooperative with said guide surface, the arrangement being such that upon moving said bar inwardly the centering means passes beyond said shoulder after the drilling portion of a tool carried by said bar has engaged the main and before the tapping portion of the tool has engaged the main.

7. In a drilling machine, a barrel adapted to be disposed in substantially radial relation to a main to be drilled and tapped, closure means for the outer end of said barrel, a boring bar rotatable and reciprocable in a bore provided in said closure means and arranged to carry at its inner end a tool having drilling and tapping portions, said barrel having an internal cylindrical guide surface terminating inwardly in an annular shoulder beyond which the barrel has a cross sectional area greater than that of said guide surface, the diameter of said guide surface being sufficient to pass the tool and the inner end of the bar, centering means on said bar adjacent the lower end of the latter cooperative with said guide surface, the arrangement being such that upon moving said bar inwardly the centering means passes beyond said shoulder after the drilling portion of a tool carried by said bar has engaged the main and before the tapping portion of the tool has engaged the main, and a flop valve cooperating with said shoulder as a seat.

FRANK H. MUELLER.
WALTER J. BOWAN.